United States Patent [19]
Gardner

[11] Patent Number: 5,775,464
[45] Date of Patent: Jul. 7, 1998

[54] TREE CHAIR

[76] Inventor: Billy D. Gardner, 4830 Camellia Ave., NW., Cleveland, Tenn. 37311

[21] Appl. No.: 862,187

[22] Filed: May 23, 1997

[51] Int. Cl.⁶ ............................................. E47C 9/10
[52] U.S. Cl. ............................................. 182/187; 182/135
[58] Field of Search ........................... 182/187, 188, 182/135, 136

[56] References Cited

U.S. PATENT DOCUMENTS

| | | | |
|---|---|---|---|
| 4,802,552 | 2/1989 | Williams | 182/187 |
| 5,101,934 | 4/1992 | Zumbro | 182/187 |
| 5,156,236 | 10/1992 | Gardner et al. | 182/135 |

*Primary Examiner*—Alvin C. Chin-Shue
*Attorney, Agent, or Firm*—Alan Ruderman

[57] ABSTRACT

A tree chair which may be secured to a tree for supporting a user at elevated dispositions includes a rigid base having a pair of spaced apart rails and a flexible band pivotally connected to each rail. The base includes a rigid V-shape tree engaging member and the bands are connectable to each other or a third band so as to encircle the tree. A seat hangs from and is adjustable relative to the base and a back support brace is pivotally mounted on the rails of the base. Sleeve forming clips are pivotally connected to opposite sides of the brace to provide guides for the banding, one band slidably passing through each sleeve prior to the bands being connected about the tree. A spring member resiliently pulls the back support brace toward the rigid gripping member so that in the operative position the brace is pulled tightly against the tree and when disassociated from the tree pulled toward the stowed condition of the tree chair.

7 Claims, 2 Drawing Sheets

TREE CHAIR

BACKGROUND OF THE INVENTION

This invention relates to a tree chair for hunters and more particularly to a tree chair comprising a frame to which a back support brace is pivotably connected, the brace pivotally carrying a guide member through which banding may slide between a pivot on the frame and tree gripping and storage positions.

When hunting deer and certain other game, it may be necessary for a hunter to be in an elevated position within a tree to preclude the game from readily picking up the scent of the hunter. Thus, a substantial number of tree stands or chairs have been marketed which permit the hunter to remain in a location up in a tree. Certain of these stands are of the climbing variety, i.e., those stands which the hunter uses to climb up to the rest position. One such stand is illustrated in Amacker U.S. Pat. No. 4,331,216 which refers to a number of other such stands. This tree stand comprises a pair of frames, each having a platform. One frame is spaced above the other during use and the hunter sits on the upper frame with his or her feet on the lower frame. Although the tree stand illustrated in this patent has a substantial number of features and advantages over the prior art, it is uncomfortable in use. For example, when locked onto a tree either or both platforms generally are inclined and tilted relative to the ground. This provides an uncomfortable situation to the user and may place the user in a disoriented position. Although addressed in the aforesaid patent, deficiencies remain in the ease of adjusting the inclination relative to the ground. Moreover, since the user sits on a metal platform with no back support after a period of time in this condition, such as 8 to 12 hours, fatigue and pain may set in and the enjoyment of the hunt is then gone. The hunter also must sit in an exposed position on the upper platform and this, especially after a long period of time, can be unnerving. Another deficiency is that both frame members can be knocked accidentally loose from the tree during climbing and also in the hunting position.

This was recognized in my U.S. Pat. No. 5,156,236 which discloses a climbing tree stand having an upper frame and a lower frame, the upper frame carrying a seat and a backrest, the seat being adjustable along the frame toward and away from the backrest, adjustable vertically and pivotable relative to the upper frame so that a hunter using the stand may vary his or her seating position and maintain his or her feet on a platform carried by the lower frame.

Each frame includes a rigid base portion and a flexible adjustable tree encircling band mounted thereon. A turnbuckle is disposed in the end portions of the band to draw or separate the ends to change the effective length of the band and, as it acts together with a gripping edge of the rigid portion to grip the tree, to change the attitude of the rigid base portion. A brace member for the backrest is pivotably mounted on the rigid base portion of each frame and is resiliently biased rearwardly against the tree and acts in conjunction with the gripping edge of the rigid portion on one side of the tree while the flexible band acts on the opposite side of the tree.

Although this tree stand functions satisfactorily it has certain disadvantages. One of these is that both frames are relatively heavy, and another is that it is relatively difficult to position the many elements for operation from a stowed condition and vice versa. For example, the band passes through guide members supported by respective bars that must be assembled to and disassembled from the guide members, the bars being pivoted to the rigid frame. Thereafter the banding must be positioned against the frame and the backrest brace pivoted forwardly. This can be a tedious and time consuming process. Moreover, during the climbing mode the seat must be slid forwardly along the frame from a rearward position to a forward position, the seat being carried by a length of banding connected to the seat and to a clip slidable on the frame, and the seat must thereafter be slid back to the operative position during use. The seat mounting is such that when the tree stand is to be placed into the stowed position, the seat is removed from the frame.

SUMMARY OF THE INVENTION

Consequently, it is a primary object of the present invention to provide a light weight tree chair that may be used with a climbing platform and which is readily folded from an operative to an inoperative or stowed position and vice versa.

It is another object of the present invention to provide a tree chair having a seat and a back rest, the seat being readily moved from a seating position to a climbing position and which, when the tree chair is folded into its stowed condition, may remain disposed on the frame.

Accordingly, the present invention provides a tree chair including a rigid base portion and a flexible adjustable tree encircling banding mounted thereon which acts together with a gripping edge of the base to grip a tree. The frame includes a seat which hangs from and is adjustable relative to the rigid base. A back support brace member is pivotably mounted on the rigid base of the frame and is resiliently biased rearwardly against the tree and acts in conjunction with the gripping edge of the base on one side of the tree while the flexible band acts on the opposite side of the tree. Clips forming sleeves are pivotably connected to the back brace at opposite sides to provide guides for the banding and the banding slides through the clips. When the brace is pivoted to the inoperative condition while the banding is released from a tree, the brace is pulled down toward the frame and the banding is automatically lowered onto the frame, and when the back brace is lifted to an operative position the banding is automatically raised and may be readily looped about a tree. Thus, all one must do is loop the banding about a tree or unloop the same and raise or lower the back brace accordingly to place the tree chair in either the operative mode or the inoperative condition.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 1:
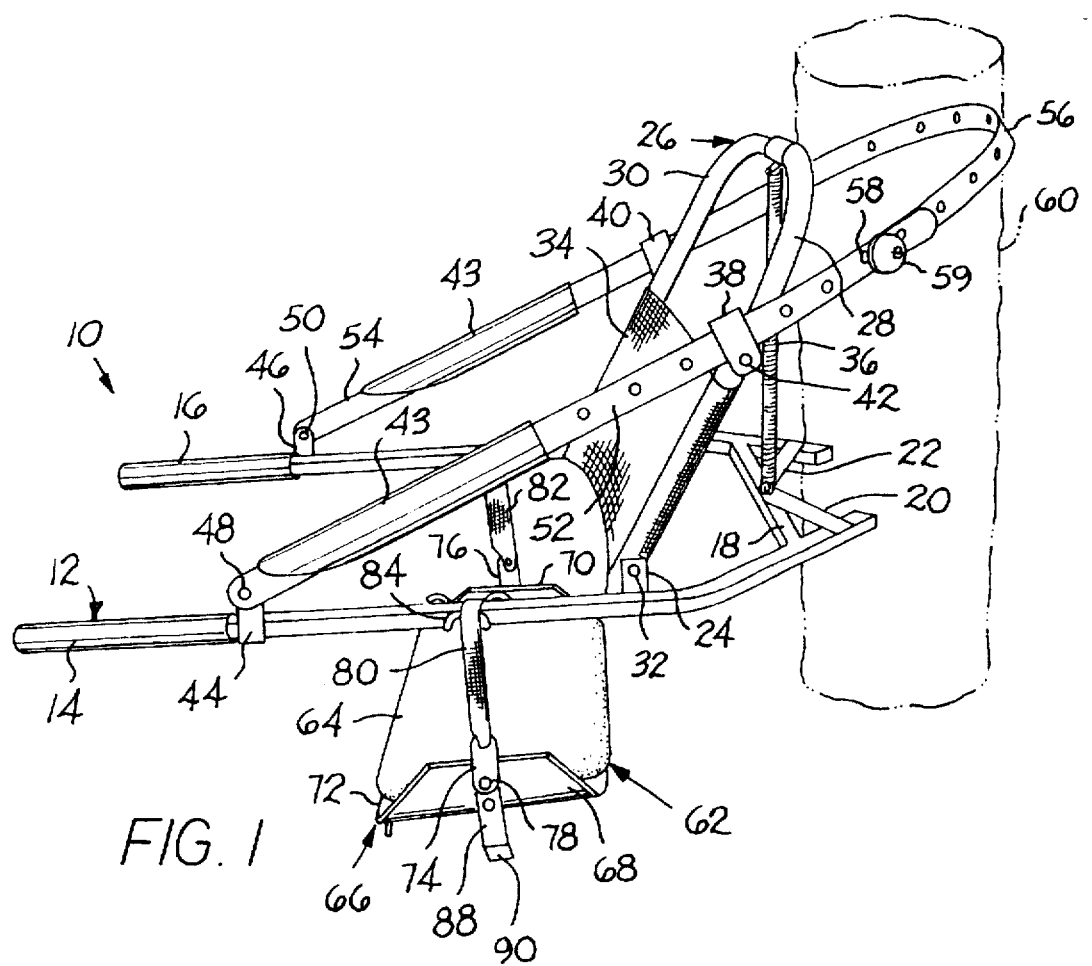
FIG. 1 is a perspective view of a tree chair constructed in accordance with principles of the present invention, the chair being illustrated in the operative position on a tree and with the seat being illustrated in the seating position.

Referring to the drawings, a tree chair constructed in accordance with the principles of the present invention is illustrated generally at 10, the chair having a rigid frame 12, the frame 12 comprising a pair of rails 14, 16 spaced apart at one end and bent adjacent the opposite end so that at the opposite end the rails converge toward each other yet remain spaced apart. A brace member 18 is connected to and between the rails 14, 16 spaced intermediate the location at which the rails are bent and the terminus of the converging ends, and a respective tree engaging member 20, 22 each in the form of a bar is secured as by welding to the brace 18 and a respective rail 14, 16 adjacent the end so as to form a crotch in the shape of a rearwardly facing Vee, as illustrated in the drawings. Preferably, the rear edge of each of the bars 20, 22 is sharpened to form sharp tree gripping edges for gripping the front of a tree.

Secured to each rail 14, 16 forwardly of the location where the rails are bent is a respective upstanding tab 24 (only one of which is illustrated). A substantially U-shaped frame 26 has the free end of each leg 28, 30 journally connected to the respective tab 24 by means of a respective journal pin 32. Fabric or plastic webbing or the like 34 is wrapped about or otherwise connected between the legs 28, 30 so as to form a back support for the user of the chair. A coil spring 36 has one end connected to the back support frame 26 at a central location intermediate the legs 28, 30 and has its other end connected to the brace member 18 substantially at the intersection of the bars 20, 22 and biases the back support frame rearwardly against a tree when in the operative position. A respective clip 38, 40 comprising a sheet metal strip bent into a U-shape form is journally connected to a respective leg 28, 30 of the back support frame 26 by means of a pin 42 passing through the free ends of the respective clip 38, 40 and into the respective leg 28, 30 to permit the clips to pivot relative to the frame, the clips forming sleeves for reasons hereinafter made clear. Protecting sleeves 43 may be received on the bands 52, 54 to protect the user if found desirable.

Intermediate the tabs 24 and the free ends of each of the legs 14, 16 at the front is another respective tab 44, 46. Journally mounted on a respective journal pin 48, 50 is one end of a respective flexible band 52, 54. The bands 52, 54, which are elongated strips of sheet metal have apertures at spaced locations at least at the rear, i.e., spaced rearwardly from the tabs 44, 46. The band 52 passes through the sleeve form by the clip 38 while the band 54 passes through the sleeve formed by the clip 40 and the rear of each band may be connected to a third band 56 by means of a respective threaded connecting member 58 preferably having a graspable knob 59 or the ends of the two bands 52, 54 may be connected together in the same manner. Thus, relative sliding may occur between the clips 38, 40 and the respective band 52, 54.

In operation, the bands 52, 54, 56 when connected as illustrated in the drawings provide a loop which may encircle a tree 60. Of course, prior to use, one of the bands 52, 54 is disconnected from the band 56 to permit the bands to loop about the rear portion of the tree prior to reconnection of the disconnected bands. The spring 36 pulls the back support frame 26 rearwardly against the front portion of the tree, and the weight of the frame 12 tilts the frame so that the rear gripping edges of the bars 20, 22 securely engage the front of the tree below the back support frame.

Thus, the chair may securely grip and be held by the tree 60. The user of the chair may then sit on a seat 62 which may comprise a cushion 64 disposed on a substantially U-shaped saddle 66 having two short upstanding end portions 68, 70 connected together by a cushion support platform 72. Each seat end portion 68, 70 has a respective bracket or tab 74, 76 pivotally connected to it by means of a pivot pin 78 (only one of which is illustrated), the tab 74, 76 also being connected to one end of a short length of woven fabric or otherwise pliable webbing 80, 82. The webbing 80, 82 has the respective other end connected to a mounting member in the form of a U-shape hook member 84, 86 bent from a steel rod so as to be removably received about and slidable on the respective rail 14, 16. The webbing is wrapped around the hook and when the hook is removed from the rail the webbing may be wrapped with more or less turns so as to adjust the length of the webbing and thus the position of the seat 62. Thus, the seat 66 is supported from the rails 14, 16 of the frame 12 and may be slidably positioned on the rails so that the user may sit on the seat with his or her back supported by the back support webbing 34.

Figure 3:
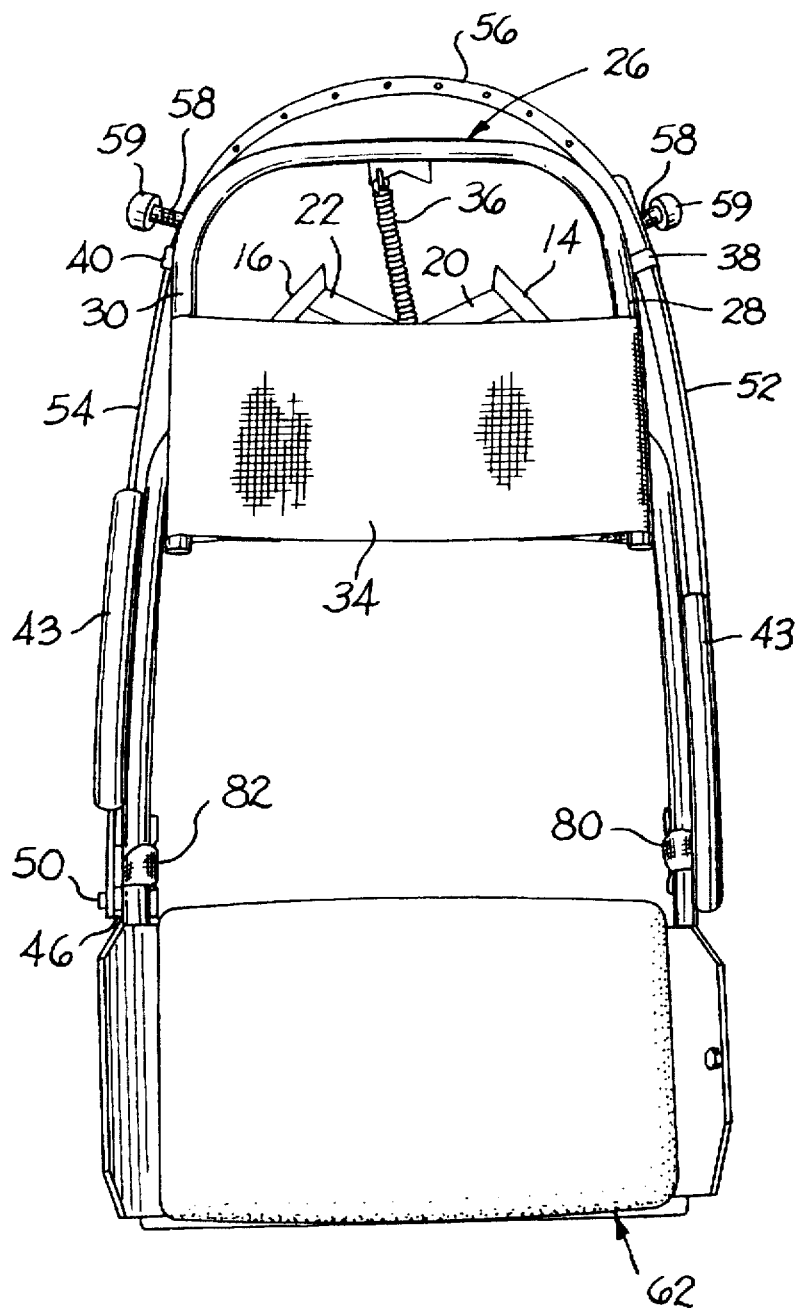
FIG. 3 is a top plan view of the tree chair in the folded or stowed condition.

In use, the chair seat may be used in conjunction with a climbing platform such as that illustrated in U.S. Pat. No. 5,156,236 or any other similar platform that may be sequentially secured to the tree so that the user may stand on the platform and raise the tree chair to a higher level in seriatim. As the user stands on such a platform he or she merely pulls the frame 26 away from the tree against the biasing force of the spring 36. This allows the band 56 and the bars 20, 22 to be released and lifted. When the frame 26 is then released, it engages the tree and pulls the bands tight against the tree. When the seat chair is to be folded into an inoperative or stowed position as illustrated in FIG. 3, the back support frame 26 is folded rearwardly aided by the force of the spring 36 and as this occurs the clips 38, 40 move with it and the banding 52, 54 slides through the clips 38, 40 and, as the back support frame 26 reaches the level of the rails 14, 16, the banding is disposed on the rails. The seat 62 may be turned by twisting the webbing 80, 82 and lifted through the spacing between the rails 14, 16 and be positioned thereon in an upside down disposition with the platform 72 on the rails and the end portions 70, 72 disposed downwardly. A small retaining clip 88 respectively secured at one end to the seat end portions 68, 70 has its opposite end bent slightly at 90 so that it can be positioned beneath the respective rail 14, 16 to retain the seat on the rails 14, 16 against movement of the seat away from the rails. Thus in the inoperative position the folded tree chair may be carried on the back of the user like a back-pack.

Figure 2:
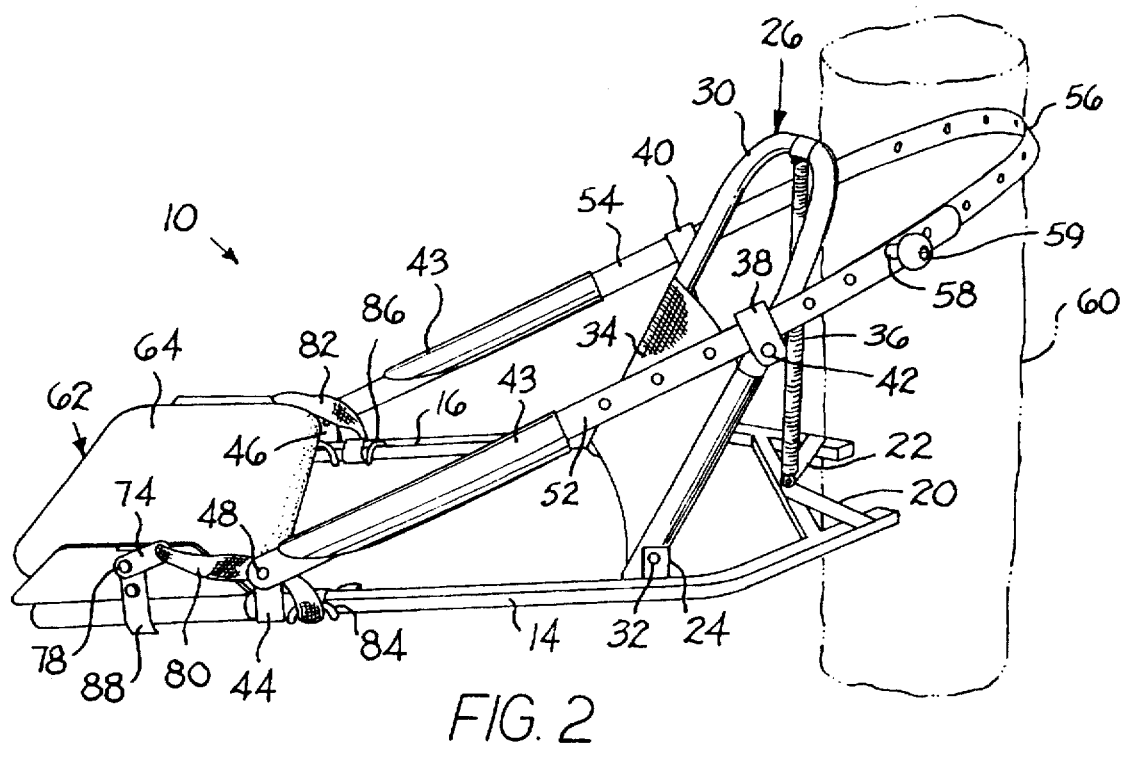
FIG. 2 is a view similar to FIG. 1 but with the seat positioned on the frame when the tree chair is raised or lowered along the tree, a stand on which the user will be positioned at that time not being illustrated.

When the tree chair is to be used, it is assembled from the stowed condition for use at a tree, one of the bands 52, 54 is disconnected from the band 56, looped about the tree and reconnected, and the back rest frame 26 is lifted. Lifting the back rest frame raises the bands and permits the bands together with the spring bias back rest frame to clamp about the tree. The seat 62 remains in the climbing mode illustrated in FIG. 2 until the tree chair is disposed on the tree at the desired location, at which time the seat is turned to move through the space between the rails 14, 16 and dropped downwardly, slid to the desired position by moving the hooks 84, 86 along the rails and disposed as illustrated in FIG. 1.

Numerous alterations of the structure herein disclosed will suggest themselves to those skilled in the art. However, it is to be understood that the present disclosure relates to the preferred embodiment of the invention which is for purposes of illustration only and not be construed as a limitation of the invention. All such modifications which do not depart from the spirit of the invention are intended to be included within the scope of the appended claims.

Having thus set forth the nature of the invention, what is claimed herein is:

1. Tree chair apparatus securable to a tree for supporting a user at elevated dispositions, said apparatus comprising a rigid frame having a pair of spaced apart rail members, said frame including rigid gripping means secured thereto intermediate said rail members for engaging and gripping a first surface of said tree facing said gripping means, flexible elongated band means including at least two bands, each band having two ends, means for pivotally connecting one end of each band to a respective rail member remote from said gripping means, a seat for accommodating a user in a sitting disposition when disposed beneath said frame, means for supporting said seat from said rail members, a seat back comprising a substantially U-shape yoke having a pair of spaced apart legs, journal means for pivotally mounting each leg to a respective rail such that the seat back may pivot relatively to said frame, a sleeve pivotally connected to each leg of said yoke spaced from said journal means pivotable relative to said back support, the second end of one of said bands extending through one sleeve and the second end of the other band extending through the other sleeve, and means for adjustably connecting the two ends of said bands together to permit said bands to loop about said tree and engage a second surface of said tree opposed to said first surface and elevated relative to said rigid gripping means, and biasing means for urging said seat back towards said rigid gripping means for tightly engaging said seat back against said tree above said rigid gripping means when said tree chair is in operative disposition.

2. Tree chair apparatus as recited in claim 1, wherein said means for supporting said seat includes a mounting member carried by a respective rail, and a pair of elongated pliable members secured at respective first ends to said seat at opposite sides of said seat and secured at second ends to said mounting member.

3. Tree chair apparatus as recited in claim 2, wherein each mounting member is selectively slidable on a respective rail.

4. Tree chair apparatus as recited in claim 2, wherein said pliable members comprise woven fabric webbing.

5. Tree chair apparatus as recited in claim 4, wherein each mounting member is selectively slidable on a respective rail.

6. Tree chair apparatus as recited in claim 4, wherein the webbing length may be adjusted about said mounting member.

7. Tree chair apparatus as recited in claim 6 wherein each mounting member is selectively slidable on a respecitve rail.

* * * * *